United States Patent [19]
Illing

[11] Patent Number: 5,206,819
[45] Date of Patent: Apr. 27, 1993

[54] CONTROL SYSTEM FOR SOLAR HEATER

[76] Inventor: Wesley R. Illing, 6622 Marilyn Dr., Huntington Beach, Calif. 92647

[21] Appl. No.: 579,358

[22] Filed: Sep. 6, 1990

[51] Int. Cl.[5] .................. F24J 2/40; G01D 18/00
[52] U.S. Cl. ................. 364/551.01; 126/587; 126/701; 126/561; 364/557; 364/571.03
[58] Field of Search ........... 364/505, 551.01, 557, 364/571.01, 571.03, 571.05; 340/501; 126/419, 422, 417

[56] References Cited

U.S. PATENT DOCUMENTS

| | | | |
|---|---|---|---|
| 3,986,489 | 10/1976 | Schlesinger | 126/422 X |
| 4,125,107 | 11/1978 | Nurnberg | 126/422 |
| 4,270,518 | 6/1981 | Bourne | 126/422 |
| 4,294,309 | 10/1981 | Godard et al. | 126/422 X |
| 4,387,422 | 6/1983 | Steutermann | 126/422 X |
| 4,397,301 | 8/1983 | Onno | 126/422 |
| 4,494,526 | 1/1985 | Wurst et al. | 126/422 X |
| 4,519,379 | 5/1985 | Schultz | 126/422 |
| 4,541,413 | 9/1985 | Cannaux et al. | 126/422 |
| 4,626,832 | 12/1986 | Farrington et al. | 340/501 X |
| 4,644,935 | 2/1987 | Gallagher | 126/422 X |

Primary Examiner—Parshotam S. Lall
Assistant Examiner—Edward Pipala

[57] ABSTRACT

Disclosed is a solar heating system including solar collectors through which a heat transfer medium is circulated by a pump between the solar collectors and a reservoir. Temperature sensors monitor the temperature of the heat transfer medium and the temperature of the environment of the system. The electronic output signals from the sensors represent these temperatures, but these signals "drift." A sunlight sensor monitors the intensity of the sunlight and provides electronic output signals representing sunlight intensity. The signal from the sunlight sensor also "drifts." To compensate for signal drift an equilibrium curve for the collectors is employed. A controller for the system has a memory element in which is stored data representing the equilibrium curve for the collector means. This curve enables the controller based on the electronic output from the sensors to determine if the collectors can gain or lose heat. The controller operates the pump in accordance with a predetermined program which relates pump operation to the ability of the collectors to either gain or lose heat as predicted by the equilibrium curve. The curve is adjusted periodically based on temperature and sunlight measurements.

20 Claims, 7 Drawing Sheets

CONTROL SYSTEM FOR SOLAR HEATER

BACKGROUND OF THE INVENTION

1. Field of the Invention

This invention relates to a solar heating system, and particularly to one including a controller having an equilibrium curve for the system that enables the controller based on temperature and sunlight conditions to determine if the system can gain or lose heat.

2. Background Discussion

In solar heating, a pump circulates a heat transfer medium in a reservoir through a solar collector exposed to sunlight. Temperature sensors sense the temperature of the heat transfer medium, commonly water. The problem is that these temperature sensors are inaccurate. Consequently, the pump is frequently not activated even though the system can gain heat. Conversely, the pump often is activated when the system shall lose heat.

The pump operation is based on the measured temperature difference between the water in the collector and the water in the reservoir. When the water in the collector is at a higher temperature than the water in the reservoir, a controller for the system turns the pump on and circulation commences. When a positive measured temperature difference can no longer be maintained, the controller turns the pump off. This approach does not work well if the measured temperatures are not the same as the actual temperatures.

It is common for the output of the temperature sensors to drift due to electronic errors, thermal cycling, and environmental degradation. The problems with conventional solar heating systems are discussed in a number of publications by the Solar Energy Research Institute of the Department of Energy, including:

1. Evaluation and Laboratory Testing of Solar Domestic Hot Water Control Systems (SERI/TR-254-1805, February 1983), and
2. Reliability Testing of Active SDHW Components, Part I: Test Results of Sensors Used in Control Systems (SERI/TR-253-2602).

Thus, an uncertainty exists in the accuracy of the measured temperatures.

To compensate for this uncertainty, the industry introduced bias terms (TB1 & TB2) used in programming the operation of the controller. Typical values for TB1 and TB2 are between 2 and 15 degrees Fahrenheit, for example, TB1 equals 8° F. and TB2 equals 3° F. The measured temperature difference must be greater than TB1 before the pump is turned on. When the measured temperature difference is less than TB2, the pump is turned off. This technique assumes that the drift of the sensors never exceeds the value of TB1 or TB2. The problem with using bias terms is that pump cycling occurs and that over time the drift in the sensors sometimes exceed the bias terms.

Some performance factors inherent in control systems which use measured temperature differences are worth noting. During start-up conditions, the system waits until the required value of TB1 is reached, at which time it turns the pump on. The temperature of the collector at this time was reached under stagnant conditions (no flow). It had taken from sunrise until that time to reach that temperature difference. When the pump turns on, the sunlight intensity will not be high enough to maintain the temperature difference of TB2 under non-zero flow conditions and so the pump will turn off. The hot water that was in the collector is now waiting in the return line between the collector and the reservoir where its heat losses are high due to the high surface to volume ratio of the return line. Cold water that was in the supply line between the reservoir and the collector is now in the collector gaining heat. Hot water that was in the reservoir is now cooling down in the supply line. On/off pump cycling occurs until a measured temperature difference greater than TB2 can be maintained or exceeded. A similar situation occurs in late afternoon when the sunlight intensity is decreasing and a measured temperature difference greater than TB2 can not be maintained, even though there is still a net heat gain potential. Under certain conditions, this mode of operation can actually lose heat when it should be gaining heat.

On/off cycling induces unnecessary duty cycles on the pump, the electronics which turn the pump on and off, and any valves in the system. Each time the pump turns on, high electrical current transients pass through the windings in the pump motor due to its natural inductance. This increases operational costs significantly. Transients of this nature shorten the pump life and the life of the electronic components which deliver the power. Valves with plastic or rubber seats suffer excessive wear, shortening their useful life. To diminish this problem, the industry introduced proportional control which varies the water flow rate with the measured temperature difference. However, a non-zero value of TB1 and TB2 must still be used due to the sensor errors.

It is important to maintain turbulent flow throughout the collectors so that heat transfer efficiency is optimized. Although proportional control diminishes the on/off cycling problem, it does not eliminate it and the system may operate with laminar flow much of the day instead of fully turbulent flow. Laminar flow can not remove heat from the collector as efficiently as turbulent flow, causing the system to operate at an efficiency level lower than it could. Proportional control systems can only be used on small fractional horsepower pumps. Pool and commercial solar systems use large pumps (1 to 10 horsepower).

Government tests and surveys as reported in Evaluation and Laboratory Testing of Solar Domestic Hot Water Control Systems (SERI/TR-254-1805, February 1983) indicate that the mean time between failure for control systems, which use measured temperature differences, is 4.1 years. The causes are:

1) If the drift of the collector temperature measurement is positive and/or the drift of the reservoir temperature measurement is negative, the measured temperature difference will be greater than the actual, causing the system to turn on too early in the morning and turn off too late in the afternoon. Eventually, the pump may remain on even after sunset. Conversely, if the drift of the collector temperature measurement is negative and/or the drift of the reservoir temperature measurement is positive, the measured temperature difference will be smaller than the actual. The system will then turn on too late in the morning and turn off too early in the afternoon. Eventually, the system may not even be able to maintain a steady state measured temperature difference greater than TB2 and the pump will than cycle on and off repeatedly during daylight hours, defining another type of failure. Regardless of the direction of the drift of the measured temperatures, the performance of a controller which uses measured temperature differences is not stable nor is it optimal.

2) Another failure mode, but more serious, can occur under freezing conditions. Some control systems circulate the water through the collectors to keep them from freezing. If the drift of the measured collector temperature is positive, the water in the collector can actually freeze before the measured temperature triggers the control system to begin circulation. Once frozen solid, no circulation can occur, even if the pump is turned on. Many of the pumps used in the industry employ the circulating water to keep them from overheating. Since no circulation can occur, the pump can overheat and burnout. Additionally, the collectors can be ruptured by the freezing water. To compound the problem, the temperature sensors for the collectors have the greatest drift potential since their environment is much harsher than that for the reservoir temperature sensors. The most reliable freeze protection system, aside from using glycol as the heat transfer medium, is to use the pump to circulate the water when freezing temperatures are approached within the collector. For this approach to be effective, sensor accuracy is crucial.

3) Sensor malfunctions present another problem to conventional controllers. If a water temperature sensor in a system fails and the control system is using measured temperature differences, the controller can do one of two things. It can turn the pump on continuously, regardless of temperature conditions, or it simply leaves the pump off regardless of conditions. In the first case, the heat gained during daylight hours is lost during twilight hours, resulting in significant heat losses at night. In the later case, no heat is gained. This subjects the collectors to extremely high temperatures during daylight hours, and risks potential freezing conditions at night.

SUMMARY OF THE INVENTION

The objective of this invention is to provide a solar heating system which operates more efficiently and optimizes the usage of pumps and valves in the system to prolong their operational life.

The solar heating system of this invention has several features, no single one of which is solely responsible for its desirable attributes. Without limiting the scope of this invention as expressed by the claims below, its more prominent features will now be discussed briefly. After considering this discussion, and particularly after reading the section of this application entitled, "DETAILED DESCRIPTION OF THE PREFERRED EMBODIMENTS," one will understand how the features of this invention provide its advantages, which include near optimal system performance, a single controller which is user friendly, automatic sensor calibration, monitors check valve seal integrity, and back-up modes of operation in case of sensor malfunction.

The first feature of this invention is that stored within the memory of the controller means is an equilibrium curve employed to determine if the system can gain or lose heat. A solar collector has associated with it an equilibrium curve which predicts the conditions under which the collector can gain or lose heat. The system is at equilibrium when the rate of heat gain equals the rate of heat loss. This curve is defined by the following equation:

$$Q = k(T_w - T_a)$$

Where

Q is the rate at which heat is being gained from sunlight, $T_w$ is the temperature of the water, $T_a$ is the temperature of the air, and k is a factor which is a function of the momentary environmental conditions in which the system operates.

The system of this invention utilizes successive approximations to determine the values for k under different conditions. Errors in measurements of conditions are automatically compensated for by the values of k. When environmental conditions approach equilibrium, the heat gains/losses approach zero. By flowing water through the collectors when reaching the predicted equilibrium point and then stopping the flow, a determination of the accuracy of the equilibrium curve can be made. If the temperature of the collectors start to increase after the flow is stopped, the collectors are capable of gaining heat at that point and the value of k should be decreased for these conditions. Conversely, if the temperature in the collectors start to decrease, the collectors are losing heat at that point and the value of k should be increased for these conditions.

The second feature is that it automatically calibrates sensors. Near equilibrium conditions, the measured temperature values of all the water temperature sensors will be approximately equal with water circulating through the system. Any difference in measured values at this time between a reference water temperature sensor and the remaining water temperature sensors can be automatically corrected. Sunlight sensor output is also corrected to compensate for drift of its output. Its voltage offset can be corrected on a daily basis while its gain can be compensated for in the equilibrium curve on a daily basis.

The third feature is that it automatically uses multiple back-up modes of operation in case of either single or multiple sensor failures. The system of this invention includes back up modes in case of sensor failure. Sensors are continually monitored to determine if they are functional. Upon detection of a non-functional sensor, the controller of the system automatically goes into a back-up mode of operation.

BRIEF DESCRIPTION OF THE DRAWING

The preferred embodiments of this invention, illustrating all its features, will now be discussed in detail. These embodiments depict the novel and non-obvious solar heating system of this invention shown in the accompanying drawing, which is for illustrative purposes only. This drawing includes the following Figs., with like numerals indicating like parts.

DETAILED DESCRIPTION OF THE PREFERRED EMBODIMENTS

Figure 1:
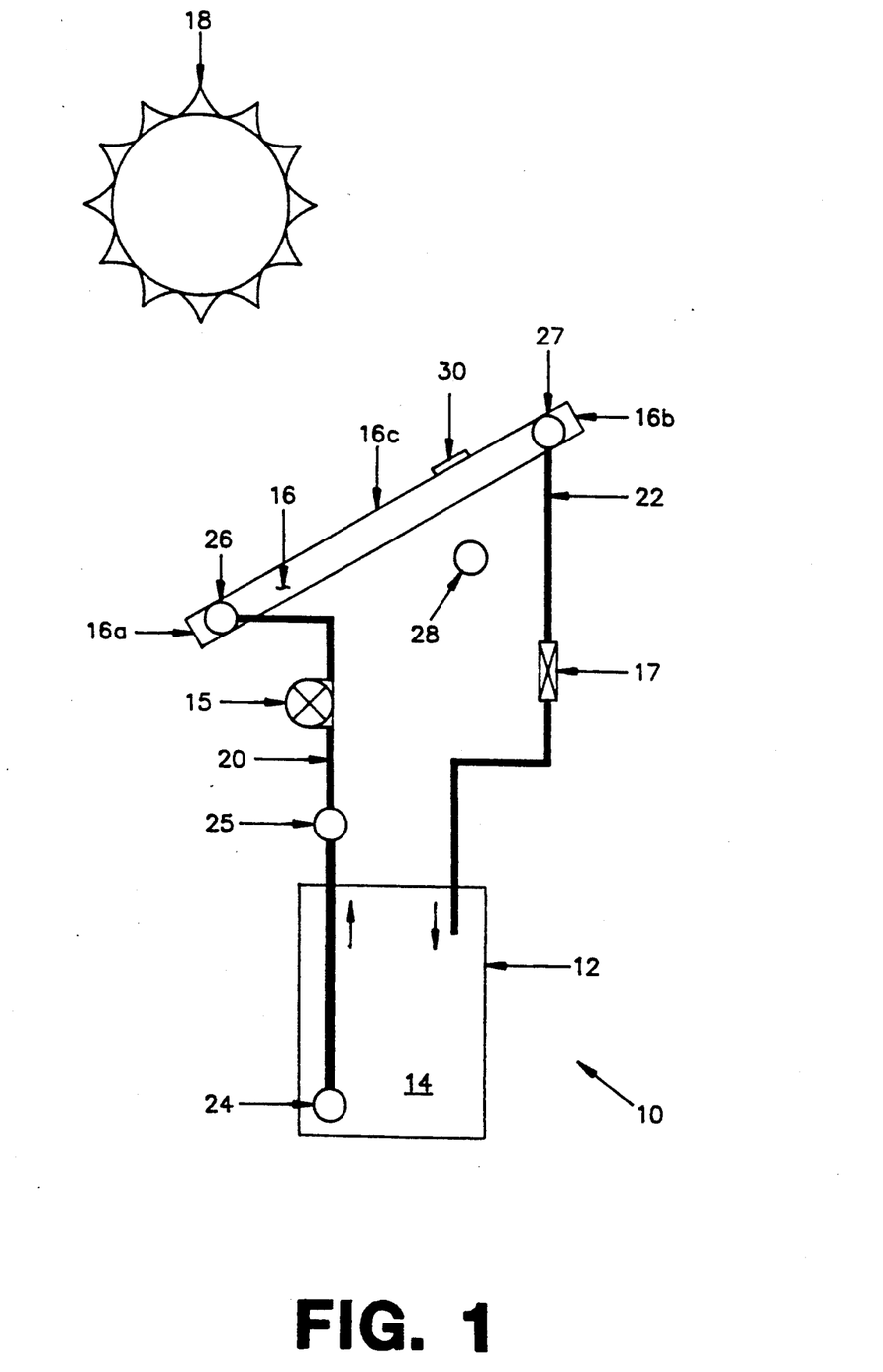
FIG. 1 is a schematic drawing of the first embodiment of the solar heating system of this invention.

As illustrated in FIG. 1, the solar heating system 10 of this invention includes a tank or reservoir 12 containing a heat transfer medium 14 such as, for example, water or a glycol solution. This heat transfer medium 14 is heated by a pump 15 circulating it through an array of solar energy collectors 16 which are exposed to solar energy from the sun 18. There is an inlet line 20 extending from the reservoir 12 to the inlet end 16a of the solar collectors 16 and an outlet line 22 extending from the outlet end 16b of the collectors to the reservoir. A check valve 17 in the outlet line 22 only allows flow in one direction, from the collectors 16 to the reservoir 12.

The collectors 16 lose heat at a rate based on the temperature differential between the heat transfer medium 14 and the surrounding environment (temperature of the air). The collectors 16 gain heat at a rate based on the intensity of the sunlight striking the collectors. Several electronic temperature sensors 24 through 27 are utilized to measure the temperature of the heat transfer medium 14 as it circulates through the collectors 16 and the reservoir 12. There is also an electronic temperature sensor 28 located in the environment surrounding the collectors 16, namely, the atmosphere, which measures the temperature of the air in the vicinity of the collectors. The air temperature sensor 28 is positioned in the shade and in a location which is best representative of the temperature of the environment in which the system is located. Mounted as illustrated in FIG. 3 is a sunlight sensor 30 which measures the relative intensity of the sunlight energy striking the collectors 16.

It is important that the sunlight sensor 30 be positioned correctly with respect to the path of travel of the sun 18. Failure to properly position the sunlight sensor 30 will result in degraded measurement of the intensity of light striking the collectors 16. The ideal position of the sunlight sensor 30 is on the surface 16c where it is exposed to the same intensity of sunlight as any other point on the surface 16c. This ideal position is dependent on the season and the position of the collectors 16.

Figure 3:
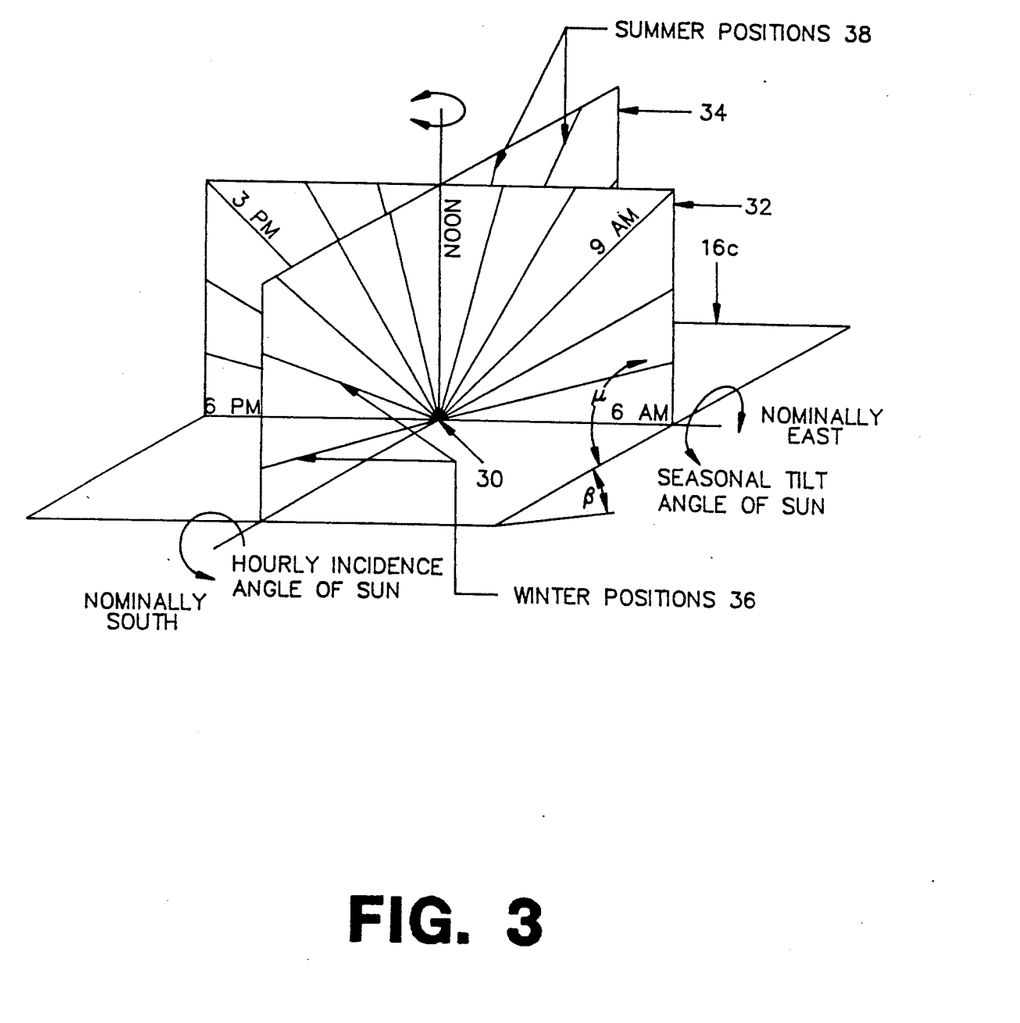
FIG. 3 is a schematic drawing illustrating how the sunlight sensor is positioned relative to the path of travel of the sun during the course of the day.

As illustrated in FIG. 3, the sun 18 travels along a course through a plane 32 to expose the surface 16c of the collector 16 to sunlight. Preferably the collectors 16 are titled at an angle $\beta$ and face in a southern direction. The plane 32 tilts to intersect a plane 34 which is at a right angle to the surface 16c of the collectors 16. This plane 34 seasonally defines the angle of the plane 32 with respect to the surface 16c. This plane 34 should be at a right angle with respect to the plane 32. As the winter approaches, the sun 18 descends in the sky in the northern hemisphere, and the plane 32 tilts, moving into one of the dotted line positions 36 which indicated the sun's path of travel through the sky during the winter months. The plane 32 moves into the dotted line position 38 during the summer months as the sun changes its course of travel with the change of seasons. The tilt angle $\mu$ between the surface 16c and the plane 32 is determined by the season and the angle $\beta$. The ideal position for the sunlight sensor 30 is on the surface 16c at the intersection between the planes 32 and 34.

Ideal positioning of the sunlight sensor 30 may also be ascertained by measuring the sensor's output, which is maximum at solar noontime as depicted in FIG. 3. On a trial and error basis, the sunlight sensor 30 can be positioned and repositioned until at solar noontime its output is maximum. This will then be the best position for the sensor 30.

Figure 5:
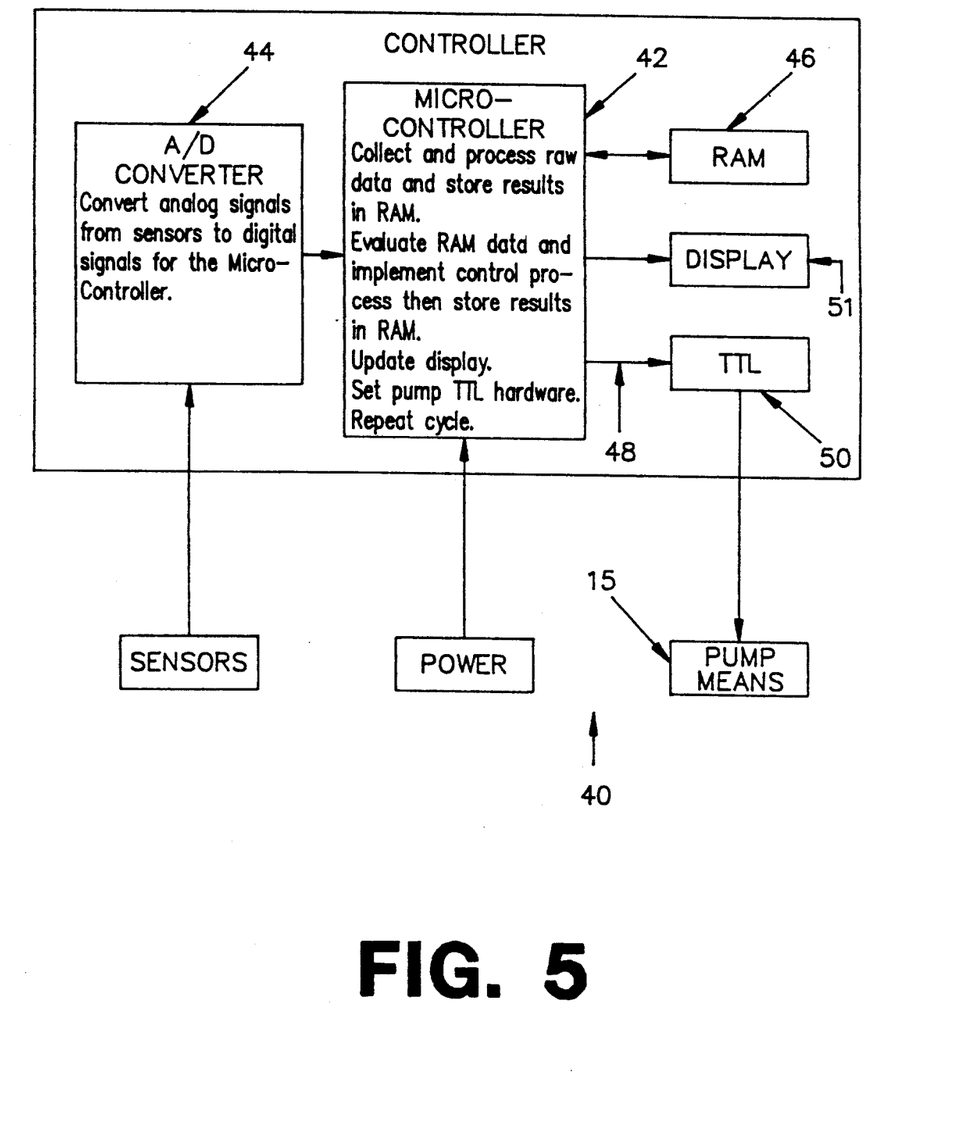
FIG. 5 is a schematic diagram of the controller employed in the solar heating system of this invention.

The operation of the solar heating system 10 is controlled by a controller 40 illustrated in FIG. 5. The central control element of this controller 40 is a MC68HC705C8 microcontroller 42 sold by Motorola Corporation. This microcontroller 42 is programmed in accordance with the flow diagrams and directions set forth in Appendix A attached hereto. "What Every Engineer Should Know About MicroComputers," authors Bennett and Evert, "Using Microprocessors and Microcomputers, 2nd Edition" authors Greenfield and Wray, which may be purchased from the Motorola Corporation, explain how to program its MC68705 microcontroller. Assembly language is used for programming. Specific information for the MC68HC705C8 is available from the Motorola Corporation in its MC68HC05C4 Advanced Information Data Sheet (AD1991R2) and its appendices J and K.

The signals from the sensors 24, 25, 26, 27, 28, and 30 are analog current signals which are converted by an A/D converter 44 to digital signals for use by the microcontroller 42. Random access memory (RAM) 46 is used to store, for example, the equilibrium curve data, sensor calibration data, etc. There are outputs 48 from the microcontroller 42 to a TTL chip 50 which controls the pump 15. A display 51 can be used to show sensor malfunctions, check valve malfunction, and/or sensor readings.

The controller 40 turns on the pump 15 when the collectors 16 can gain heat and turns off the pump when this condition no longer prevails. When the collectors 16 lose heat as fast as they gain heat they are at equilibrium. If the whether does not change drastically during the course of a day, equilibrium conditions occur usually twice a day in the American Sun Belt: usually between 6:00 and 10:00 A.M., and 3:00 and 7:00 P.M.

When the pump 15 is turned on, it pumps the heat transfer medium 14 from the reservoir 12 through the inlet line 20 into the lower, inlet end 16a of the collectors 16. The heat transfer medium 14 flows through the collectors 16 and its temperature is elevated. This heated heat transfer medium 14 exits the upper, outlet end 16b of the collectors 16 and then flows through the outlet line 22 and check valve 17 into the reservoir 12. Except when testing to determine if equilibrium is occurring in the collectors 16, the pump 15 circulates continually the heat transfer medium 14 through the system 10 as long as conditions prevail that result in a reasonable amount of heat being gained by the heat transfer medium.

The check valve 17 closes when flow stops. This prevents circulation of the heat transfer medium 14 when the system 10 can no longer gain heat. At night when the heat transfer medium 14 in the collectors cools, it drains due to gravity from the collectors 16 through the inlet line 20 and forces water from the reservoir 12 upwardly through the outlet line 22. The check valve stops this flow through outlet line 22, thereby preventing lose of heat from of the system 10 at night. Alternately, the check valve 17 could be in inlet line 20.

The system 10 may have the heat transfer medium 14 in the collectors 16 on a continuous basis. In this case it is important to have the check valve 17 in the system 10 in order to prevent the heat transfer medium 14 from circulating at night. A system such as system 10 has the sunlight sensor 30 so that it can be determined when nightfall has arrived. It also has calibrated temperature sensors 24, 25, 26, and 27. With these features it then can establish with certainty if the check valve 17 is leaking.

When the check valve 17 leaks, warm water from the reservoir 12 convects up the outlet line 22 to the collectors 16 and leads the controller 40 to believe that the system can gain heat by the measured temperature difference between the collector outlet temperature sensor 27 and the reservoir temperature sensor 24. If the controller 40 turns the pump 15 on to retrieve this heat, it will turn off shortly thereafter since the sensor 27 will drop in temperature as soon as the cold water in the collectors 16 flows by it. Hence the pump 15 would then turn back off. If this occurs several times during the night, then the check valve 17 needs to be replaced or repaired. As specified in routine M7 in Appendix A, the controller 40 is programmed to detect this condition of the check valve 17 and provide a warning signal that is shown on the display 51 that the check valve 17 is malfunctioning.

In accordance with this invention, the controller 40 turns the pump 15 on and off based on the predicted ability of the heat transfer medium 14 to gain or lose heat. When it is predicted that the heat transfer medium 14 is expected to gain heat, the pump 15 is turned on. When it is predicted that the collectors 16 cannot transfer heat to the heat transfer medium, the pump 15 is turned off. Accurate control is provided even though the temperature and sunlight intensity measurements are not accurate. This result is achieved because derivatives of the temperature and sunlight intensity measurements are used to determine an equilibrium curve. Moreover, the equilibrium curve is continually redefined to compensate for measurement errors.

Figure 2A:
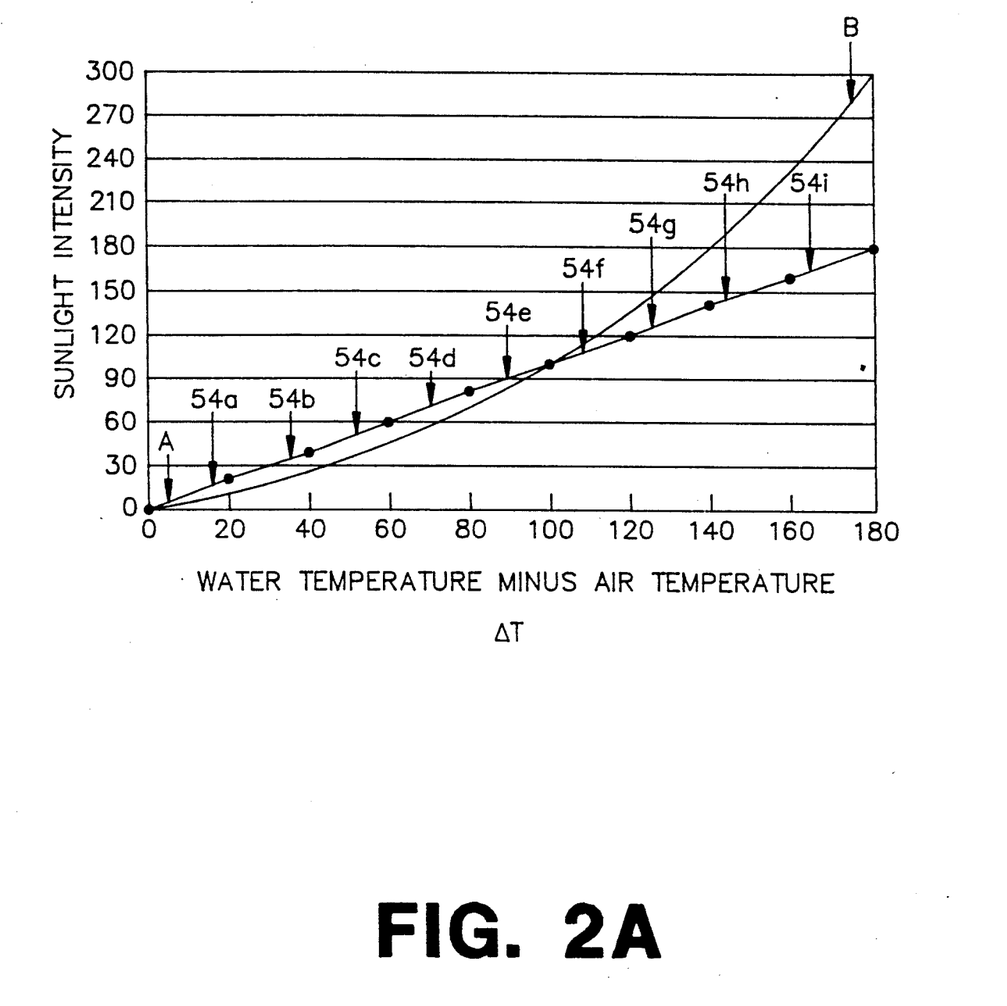
FIG. 2A through FIG. 2C are graphs depicting the equilibrium curve utilized in controlling the circulation of the heat transfer medium through the solar heating system illustrated in FIG. 1.
Figure 2B:
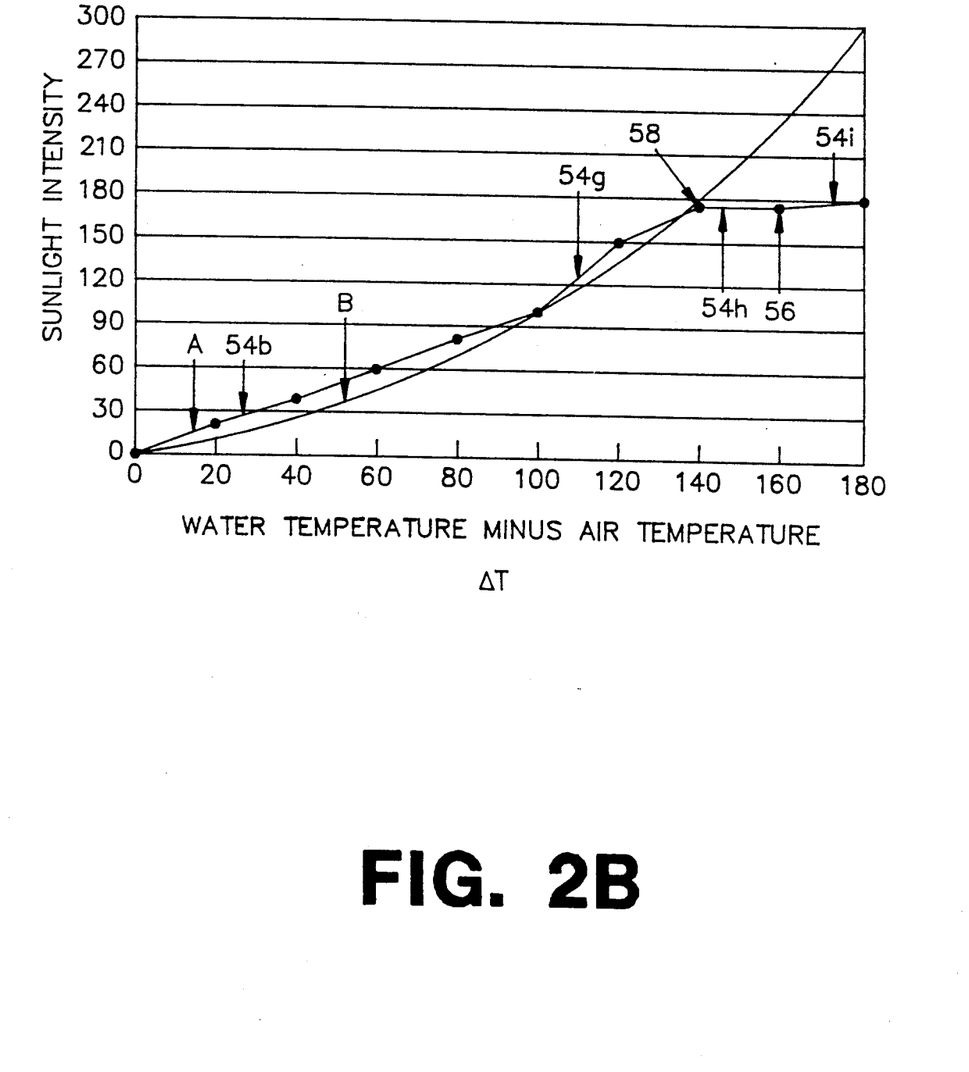
Figure 2C:
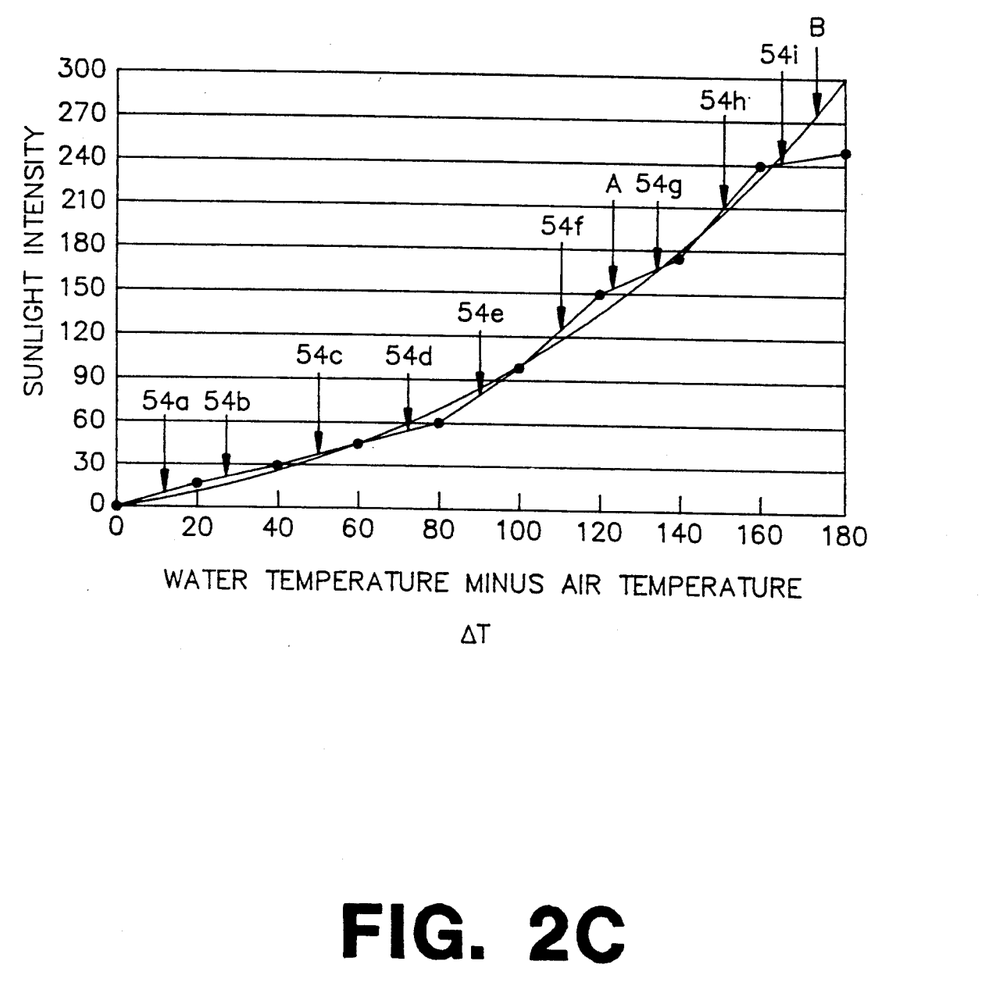

FIGS. 2A, 2B and 2C depict exemplary equilibrium curves for the system 10. In FIGS. 2A, 2B and 2C, the difference ($\Delta T$) between the temperatures of the heat transfer medium and the environment in degrees Fahrenheit are plotted along the abscissa, and the values of the sunlight intensity in British Thermal Units per hour per square foot are plotted along the ordinate. FIGS. 2A, 2B and 2C each show a dotted line curve A and a solid line curve B. The dotted line curve A is an estimation of the equilibrium curve for the system 10. It is not expected to be initially accurate and it shall be redefined to improve its accuracy based on actual measurements taken during the course of the operation of the system 10. The solid line B represents the actual equilibrium curve for the system 10. This solid line curve B has factored into it the errors in the sensor measurements. It shall change shape with changing seasons.

FIGS. 2A, 2B and 2C illustrate how the estimated equilibrium curve A is modified over a three day period based actual temperature and sunlight intensity measurements. For example, according to curve A in FIG. 2A, when the $\Delta T$ is 100° F., the light intensity must be the equivalent of at least 100 BTU's/ square foot-hour, otherwise the heat transfer medium 14 can not upon passing through the collectors 16 gain any heat. Thus, the pump 15 does not turn on until this condition prevails.

While there are an infinite number of ways to define the estimated curve A so that it approximates the actual equilibrium curve B, a very simple and effective approach is to approximate it using a piece-wise linear curve. In other words, the nonlinear curve B can be approximated with a finite number of linear segments 54a–54i which approach its shape. This technique is illustrated by the following EXAMPLE.

EXAMPLE

1. Define the useful operating $\Delta T$ temperature range of the system 10, for example, 0° to 180° F., and break this range up into a finite number of segments 54a through 54i, for example. Define the end points of each segment so that they are common to the neighboring segments. In FIG. 2B an improved estimated curve A is illustrated. Hence, an adjustment to a particular segment results in an adjustment to its two neighboring segments as well. More segments will improve curve fitting accuracy but will increase the time required for the system 10 to accurately approximate the actual equilibrium curve B and will result in slower shifts due to seasonal variations.

2. As conditions for the system 10 approach the estimated equilibrium curve A in the morning and afternoon, the temperatures will fall within one of the segments. If, as determined by calculation of temperature derivatives as discussed below, the system 10 is losing heat for a particular segment, then this particular segment needs to be adjusted so that higher values of sunlight intensity are used to redefine this segment. Conversely, if the system 10 is gaining heat, the segment needs to be redefined for lower values of sunlight intensity.

3. Occasionally, an adjustment will result in a sunlight intensity value higher than what exists at an adjacent segment. Since higher operating temperatures require higher values of sunlight intensity, curve smoothing techniques can be used to adjust points which are out of line with the most recent adjustment. This is exemplified on the curve A, FIG. 2B for day two, where the point 56 at 160° F. for the segment 54h would have been below the newly adjusted endpoint 58 at 140° F. for the segment 54g.

4. Repeating steps 2 and 3 every day redefines the piece-wise linear curve A to approximate closely the actual equilibrium curve B. Large adjustments will change the curve faster but will reduce the accuracy of the final curve fit.

The preceding EXAMPLE arbitrarily defined temperature as the independent variable along the abscissa, resulting in adjustments to the sunlight intensity being arbitrarily defined as the dependent variable along the ordinate. It is important to note that sunlight intensity could have been defined as the independent variable which would have resulted in adjustments being made to the temperature values when determining the estimated equilibrium curve A.

As depicted in FIG. 2A, on day one, the system 10 turns the pump 15 on when the water temperature minus the air temperature is between 20° and 40° F., segment 54b, and turns the pump off between 120° and 140° F., segment 54g. Since the system 10 according to the actual equilibrium curve B was capable of gaining heat when turned on, the sunlight intensity values in segment 54b are reduced as shown in the curve A in FIG. 2B for day two. In the afternoon when the pump 15 is turned off, the system 10 is not capable of gaining heat. Hence, the values of the sunlight intensity were increased as shown in the curve A in FIG. 2B for day two in the segment 54g.

On day two, the pump 15 is shown to turn on between temperatures of 60° and 80° F., segment 54d, while turning off between temperatures of 140° and 160° F., segment 54h. The results are shown on the adjusted curve A in FIG. 2C for day three.

The way to determine if the collectors 16 are gaining or losing heat near equilibrium conditions, after thermal transients have subsided after discontinuing full flow, is to calculate temperature derivatives of the collectors 16 under stagnation conditions. After thermal transients have subsided, the heat transfer medium 14 in the collectors 16 are at nearly the same temperature as the heat transfer medium in the reservoir 12. Derivatives from this point forward under stagnation conditions indicate whether the collectors 16 can gain or lose heat for sunlight intensity, temperature of the ambient air, and temperature of the heat transfer medium at particular measured conditions. (It is assumed that heat gains and losses from the inlet line 20 and outlet line 22 are not significant.)

Temperature derivatives can be approximated by calculating finite temperature differences over a finite time. The collectors 16 have a positive derivative if they are gaining heat and a negative derivative if they are losing heat. An example of how one could determine the temperature derivative is as follows:

a) Create a set of moving time lines which store sensor outputs as a function of time. The size of the time line must be large enough for the environmental conditions to change sufficiently to detect a measurable difference, yet be small enough to reach a decision before system performance is significantly degraded.

b) Collect periodically new data and shift the time lines to include this new data and exclude the oldest data.

c) Calculate the average change in temperature per change in time for the sets of data in each time line.

During the course of a typical day the system 10 passes through equilibrium twice. In the morning, the light intensity will be such that the system 10 will neither gain nor lose heat. That is, the temperature difference between the temperature sensors 24, 25, 26 and 27 will be near zero. This condition will occur also later in the day when the system 10 will no longer either gain or lose heat. For example, if one of the sensors indicates a significant difference between the other sensors, this sensor can be compensated for or adjusted by the controller 40 offsetting or correcting this sensor reading.

It may be desirable to calibrate manually one of the temperature sensors measuring the temperature of the heat transfer medium 14, for example the temperature sensor 25 at the exit of the reservoir 12. This manual calibration can be accomplished by simply immersing the sensor 25 in ice water and setting the output at 32 degrees Fahrenheit and the immersing the sensor in boiling water and setting the output at 212 degrees Fahrenheit. This sensor 25 may now be used as a reference in conducting the automatic calibration discussed above.

Derivatives are also useful for determining if sensors are operating properly or are malfunctioning. Environmental conditions are not constant. Hence the derivatives of the measurements of these conditions can not be zero since there will always be some measurable change. Continuously monitoring the derivatives of the sensor output signals provide notification if the sensors are still functioning. It is important to separate variations in sensed conditions from electronic noise. It is comon practice in design of electronics to establish a "noise floor." This noise floor can be used to establish the maximum contribution to a derivative that the noise floor can make. This value then becomes the minimum value allowable for derivatives of sensed conditions. The values of the derivatives as contributed by the noise floor must be smaller than the derivatives of the sensed conditions.

While derivatives can be used very effectively to confirm temperature sensor operation they are less effective in confirming sunlight sensor operation. At night the sunlight sensor will only measure the changes in light intensity coming from the night sky (stars, moon and street lights). Hence the derivative of the sunlight intensity may be smaller than the derivative due to the noise floor. In this case additional information is needed. When sunlight derivatives are small, the sunlight intensity must be near zero or near its maximum value. If the sunlight is near the minimum value and the collectors 16 are significantly warmer than the resevoir 12, then the sunlight sensor 30 must have failed. If the measured sunlight is near its maximum value when its derivative is zero, the derivative can not stay near zero for very long. Initiating a time delay counter during this condition allows the sunlight intensity to decrease enough to change the derivative significantly enough for it to rise above the minimum threshold.

Figure 4:
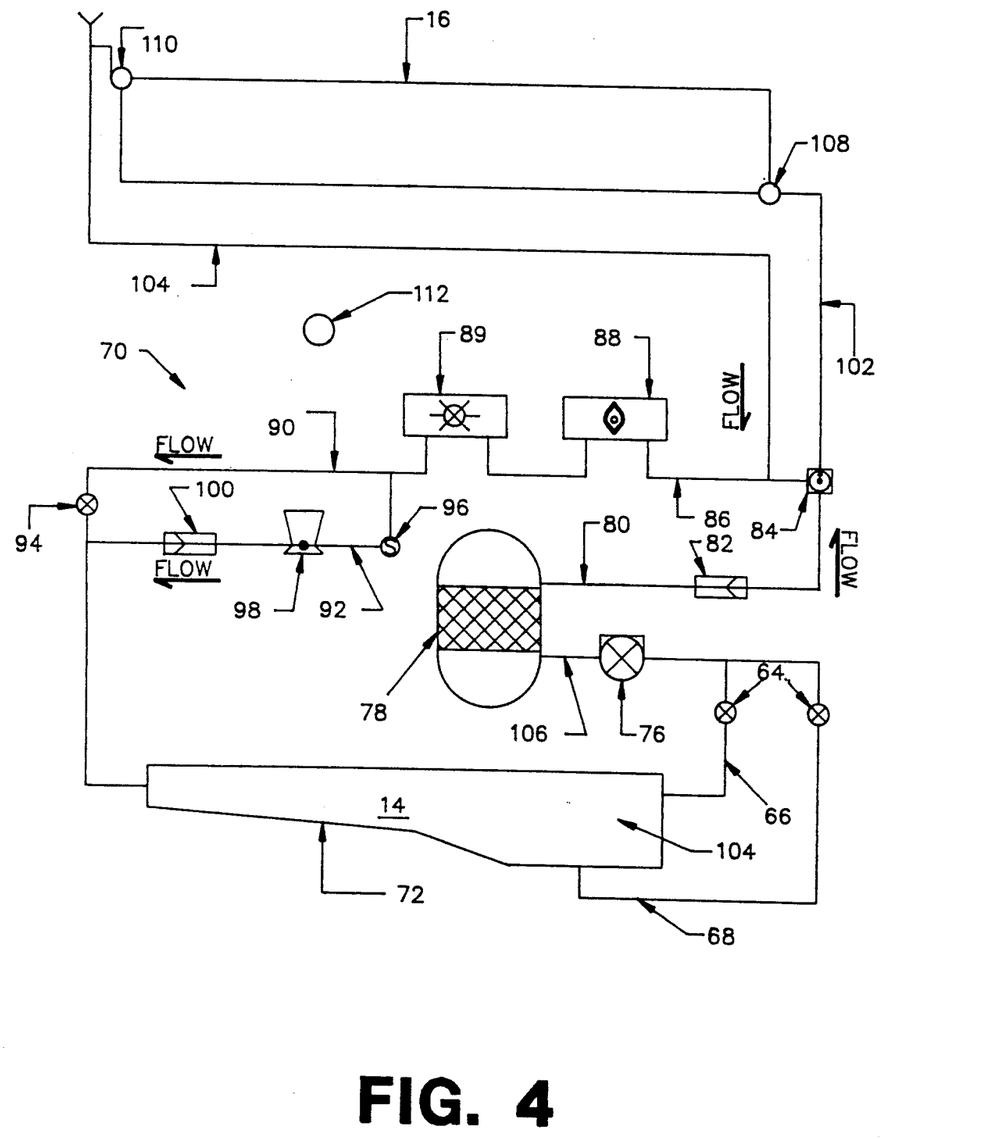
FIG. 4 is a schematic illustration of an alternate embodiment of this invention utilized in heating spas or swimming pools.

An alternate embodiment of this invention, the solar heating system 70, is depicted in FIG. 4. The solar heating system 70 is for a swimming pool with the pool 72 constituting a large reservoir of water 14, the heat transfer medium. Water is preferably drawn from both the top and bottom levels of the pool 72 through the lines 66 and 68, each of these lines including gate valves 64. This water 14 is pumped by a pump 76 to an array of solar collectors 16. This pump 76 is operational for a minimum time period each day to assure that the water 14 is circulated through a filter 78, a line 80 including a check valve 82, through a motorized diverter valve 84, a line 86 into a heater 88. From the heater 88 the water flows through a magnetic water conditioner and purification device 89 and then either through line 90 or line 92 back into the pool 72. A manually operated gate valve 94 is in the line 90, and a solenoid operated valve 96, feeder 98 for feeding sanitizers like chlorine into the water, and check valve 100 are in line 92.

The diverter valve 84 directs the flow of water either to the solar collectors 16 or bypasses these collectors to direct the water through the water purification and conditioner device 89 back to the pool 72, either through line 90 or line 92, depending on the position of the solenoid valve 96. The diverter valve 84 and pump 76 work together to conserve energy. (The two working in conjunction with each other are considered pump means.) It is impractical to turn the pump 76 on and off because it must remain on for the minimum time period each day. So instead, when stagnation conditions are desired to adjust the equilibrium curve, the diverter valve 84 is moved to a position so the water bypasses the collectors 16. When the collectors 16 can gain heat and the equilibrium curve is not being adjusted, the diverter valve 84 is opened, and the pump 76 pumps the water from the pool 72 through the diverter valve 84 and line 102 and then through the solar collectors 16 and line 104 back through lines 86 and 90 or 92 into the pool 72.

Similar to the system 10, a sunlight sensor 30 positioned as shown in FIG. 3 is employed to measure the intensity of light striking the collectors 16 in system 70. There is a temperature sensor 104 in the pool 72, a reference temperature sensor 106 which may be manually calibrated as discussed above in the inlet line to the filter 78, a collector inlet temperature sensor 108 at the inlet of the solar collectors 16, a collector outlet temperature sensor 110 at the outlet of the solar collectors, and an air temperature sensor 112, preferably in a shaded environment.

This solar heating system 70 operates generally in the same manner as system 10, except the diverter valve 84 is used to achieve stagnation conditions when adjusting the equilibrium curve. This avoids cycling the pump 76 in the morning since pool pumps are relatively large and equilibrium curve adjustment periods are short, typically 5-10 minutes.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims:

I claim:

1. A method of controlling the operation of a solar heating system including solar collector means through which a heat transfer medium is circulated by pump means between the solar collector means and a reservoir, comprising
    (a) establishing an equilibrium curve for the solar collector means which relates s measured intensity of sunlight at any given point in time to a measured differential in temperature between the temperature of the heat transfer medium and a reference environmental temperature for the system,
    (b) measuring the intensity of the sunlight and the temperature of the heat transfer medium using sensing means which drift,
    (c) when according to the equilibrium curve, the measurements in step (b) indicate that the heat transfer medium should gain heat upon circulation through the collector means, turning on the pump means to circulate said medium through the collector means for a sufficient time period to allow significant thermal transients to subside,
    (d) stopping the pump means to discontinue circulation of the heat transfer medium through the collector means and determining whether the collector means is decreasing or increasing in temperature,
    (e) adjusting the equilibrium curve as required by the determination of step (d),
    (f) turning on the pump means until the sunlight intensity measurement of step (b) according to the equilibrium curve indicates that the heat transfer medium shall lose heat upon circulation through the collector means and then turning off the pump means,
    (g) again determining whether the collector means is decreasing or increasing in temperature upon turning off the pump means in step (f), and
    (h) adjusting the equilibrium curve as required by the determination from step (g).

2. The method of claim 1 wherein the reference environmental temperature of the system is the measured air temperature.

3. The method of claim 1 wherein the measurements are taken in periodic intervals.

4. A method of controlling the operation of a solar heating system including solar collector means through which a heat transfer medium is circulated by pump means between the solar collector means and a reservoir, comprising
    controlling the operation of the pump means in accordance with an equilibrium curve for the collector means which relates a measured sunlight intensity at any given point in time to a differential in temperature between a measured temperature of the heat transfer medium and a reference environmental temperature for the system using sensing means for measuring which drift, and
    determining a temperature derivative for the collector means under stagnation conditions and adjusting the equilibrium curve as required by said temperature derivative determination.

5. A solar heating system including
    solar collector means through which a heat transfer medium is circulated by pump means between the solar collector means and a reservoir,
    temperature sensing means for monitoring the temperature of the heat transfer medium and the temperature of the environment of the system which provide electronic output signals which drift representing said temperatures,
    sunlight sensing means for monitoring sunlight intensity which provide electronic output signals which drift representing said sunlight intensity,
    controller means including memory means in which is stored data representing and equilibrium curve for the collector means that enables the controller means based on the electronic output signals from the sensing means to determine if the collector means can gain or lose heat,
    said controller means operating the pump means in accordance with a predetermined program which relates the pump means operation to the ability of the collector means to either gain or lose heat as predicted by the equilibrium curve, and
    means for determining a temperature derivative for the collector means under stagnation conditions and adjusting the equilibrium curve as required by said temperature derivative determination.

6. The solar heating system of claim 5 including check valve means located in a line through which the heat transfer medium circulates between the solar collector means and the reservoir, said predetermined program including a routine which detects when the check valve is malfunctioning.

7. The solar heating system of claim 5 wherein the controller means includes means for calibrating the temperature sensing means which comprises
    a reference temperature sensing element providing an output signal that corresponds to a measured temperature of the heat transfer medium,
    means for comparing the output signals of the other temperature sensing means monitoring the temperature of the heat transfer medium with the output signal of the reference temperature sensing element, means for compensating for differences in the output signals from the other temperature sensing means, and said comparing means and compensating means being activated near equilibrium.

8. The solar heating system of claim 5 wherein the values of the electronic output signals from the temperature sensing means are collected over the entire operating temperature range of the system and stored in the memory means to provide a calibration curve.

9. The solar heating system of claim 5 wherein the sunlight sensing means is calibrated so that, when environmental conditions are such that there is no sunlight, said predetermined program automatically compensates for any error in the sunlight sensor means under these environmental conditions.

10. A solar heating system including solar collector means having an inlet and an outlet, a reservoir having an inlet and outlet and adapted to hold a heat transfer medium, said reservoir being in communication with the solar collector means so that the heat transfer medium may be circulated between said solar collector means and the reservoir, pump means for circulating the heat transfer medium between the solar collector means and the reservoir, and monitor and control means for the system comprising (a) a plurality of electronic sensor means which provide an electronic output signal which drifts indicative of temperature, including first sensor means in the reservoir for monitoring the temperature of the medium in the reservoir, second sensor means at the outlet of the reservoir for monitoring the temperature of the medium as said medium exits the reservoir, third sensor means at the inlet of the solar collector means for monitoring temperature at the inlet to said collector means, fourth sensor means at the outlet of the solar collector means for monitoring the temperature at the outlet of said collector means, and fifth sensor means in the environment of the system for monitoring the temperature of the environment, (b) sunlight sensing means for measuring the intensity of the sunlight at any given point in time, said sunlight sensing means providing a signal which drifts, (c) means for establishing an equilibrium curve for the collector means which relates a measured sunlight intensity to a differential in temperature between a measured temperature of the heat transfer medium and a reference environmental temperature for the system, and (d) means for controlling the operation of the pump means in accordance with the ability of the collector means to gain or lose heat, including controller means having memory means in which are stored data corresponding to the equilibrium curve, means programmed to compare the output signals from the temperature and sunlight sensing means with said data to determine if the pump means should be turned on or off, means for determining a temperature derivative for the collector means under stagnation conditions and adjusting the equilibrium curve as required by said temperature derivative determination, and means for detecting sensor means malfunction comprising means for determining a temperature derivative for each of said sensor means, and, when said temperature derivative is repeatedly near zero thereby indicating sensor means malfunction, said controller means discontinuing using the output signal from said malfunctioning sensor.

11. The solar heating system of claim 10 including means for detecting the malfunction of the sunlight sensor means comprising means for measuring the output of the sunlight sensor means, means for determining the derivative of the output of the sunlight sensor means, said derivative of the output of the sunlight sensor means being near zero when said sunlight sensor is malfunctioning, means for determining if the collector means can gain heat based on a differential in temperature between collector means and the reservoir, and means which discontinues using the output signal from said sunlight sensor means when the derivative of the output of the sunlight sensor means is near zero and the collector means can gain heat based on a differential in temperature between said collector means and the reservoir.

12. The solar heating system of claim 10 including means for detecting the malfunction of the sunlight sensor means comprising means for measuring the output of the sunlight sensor means, means for determining the derivative of the output of the sunlight sensor means, said derivative of the output of the sunlight sensor means being near zero when said sunlight sensor is malfunctioning, and means which discontinues using said sunlight sensor means when the derivative of the output of the sunlight sensor remains near zero for a predetermined period and the output of the sunlight sensor means exceeds a preestablished threshold value.

13. A solar heating system including a solar collector means having an inlet and an outlet, a reservoir having an inlet and outlet and adapted to hold a heat transfer medium, said reservoir being in communication with the solar collector means so that the heat transfer medium may be circulated between said collector means and the reservoir, pump means for circulating the heat transfer medium between the solar collector means and the reservoir, and monitor and control means for the system comprising (a) a plurality of electronic sensor means which provide an electronic output signal indicative of temperature, said output signal drifting, including first sensor means in the reservoir for monitoring the temperature of the medium in the reservoir, second sensor means for monitoring the temperature of said collector means, (b) sunlight sensor means for measuring sunlight intensity at any given point in time, said sunlight sensing means providing a signal which drifts, (c) means for establishing an equilibrium curve for the collector means which relates the sunlight intensity to a differential in temperature between the temperature of the heat transfer medium in the reservoir and a reference environmental temperature for the system, and (d) means for controlling the operation of the pump means in accordance with the ability of the collector means to gain or lose heat, including controller means having memory means in which are stored data corresponding to the equilibrium curve, means programmed to compare the output signals from the temperature and sunlight sensor means to determine if the pump should be turned on or off, and means for periodically determining a temperature derivative for the collector means under stagnation conditions and adjusting the equilibrium curve as required by said temperature derivative determination.

14. The solar heating system of claim 13 including third temperature sensor means in the environment of the system which provides an output signal corresponding to said reference environmental temperature.

15. The solar heating system of claim 13 wherein the second sensor means comprises a plurality of temperature sensing elements at different points along the solar collector means.

16. The solar heating system of claim 15 wherein one of said temperature sensing elements is located near the inlet of the solar collector means and another of said temperature sensing elements is located near the outlet of the solar collector means.

17. The solar heating system of claim 13 including fourth sensor means at the outlet of the reservoir for monitoring the temperature of the medium as said medium exits the reservoir.

18. The solar heating system of claim 13 including means for detecting sensor means malfunction.

19. The solar heating system of claim 18 wherein the means for detecting sensor means malfunction comprises means for periodically determining a temperature derivative for the collector means and, when said temperature derivative is repeatedly near zero, the controller means discontinues using the output signal from said malfunctioning sensor.

20. A monitor and controller for a solar heating system having solar collector means in communication with a reservoir holding a heat transfer medium, and pump means for circulating the heat transfer medium between the solar collector means and the reservoir, said monitor and controller including (a) a plurality of electronic sensor means which provide an electronic output signal indicative of temperature, said signal from said sensor means drifting, including first sensor means in the reservoir for monitoring the temperature of the medium in the reservoir, second sensor means for monitoring the temperature of said solar collector means, (b) means for measuring sunlight intensity at any given point in time, said intensity measuring means providing a signal which drifts, (c) means for establishing an equilibrium curve for the system which relates a measured sunlight intensity to a differential in temperature between a measured temperature of the heat transfer medium and a reference environmental temperature for the system, and (d) means for controlling the operation of the pump means in accordance with the ability of the solar collector means to gain or lose heat, including memory means in which are stored data corresponding to the equilibrium curve, means programmed to compare the output signals from the temperature sensors and the means for measuring the intensity of the sunlight with said data to determine if the pump means should be turned on or off, and means for determining a temperature derivative for the system under stagnation conditions and readjusting the equilibrium curve as required by said temperature derivative determination.

* * * * *